United States Patent Office 3,558,787
Patented Jan. 26, 1971

3,558,787
METHODS AND COMPOSITIONS FOR CONTROLLING PLANT-PATHOGENIC FUNGI UTILIZING 1,4-DIHYDRO-9,10-ANTHRAQUINONES
Jesse Harmon, Hockessin, Del., assignor to E. I. du Pont de Nemours and Company, Wilmington, Del., a corporation of Delaware
No Drawing. Filed Jan. 23, 1968, Ser. No. 699,792
Int. Cl. A01n 9/24
U.S. Cl. 424—331
6 Claims

ABSTRACT OF THE DISCLOSURE

Plant-pathogenic fungi can be effectively controlled by applying to the area of infestation or anticipated infestation one or more compounds of the formula

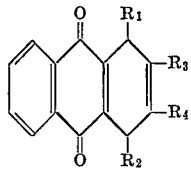

wherein
$R_1$ and $R_2$ are each selected from hydrogen, alkyl of 1 to 3 carbon atoms and alkenyl of 2 to 4 atoms or $R_1$ and $R_2$ together form a methylene or ethylene group and
$R_3$ and $R_4$ are each selected from hydrogen and methyl.

These compounds are particularly effective in the control of fungi of the class Phycomycetes.

BACKGROUND OF THE INVENTION

Effective, economical methods and compositions for preventing damage to crops and ornamental plants by plant-pathogenic fungi are needed to protect the financial interests of farmers and horticulturists. More importantly, such methods are needed to insure an adequate supply of the agricultural and horticultural commodities required by the ever-expanding world population.

There is a particular need for agents useful in the control of fungi of the class Phycomycetes because they are among the most virulent organisms responsible for diseases on agricultural and ornamental crops. The diseases for which members of this class are responsible include late blight of tomatoes and potatoes, downy mildews of grapes and cucurbits and Pythium root rots.

The methods and compositions of this invention are markedly effective in the control of a variety of fungicidal diseases of plants and plant parts and are especially effective in the control of Phycomycetes.

SUMMARY OF THE INVENTION

In summary, this invention relates to methods for controlling plant-pathogenic fungi comprising applying to a locus to be protected an effective amount of a 1,4-dihydro-9,10-anthraquinone of the formula

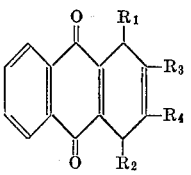

wherein
$R_1$ and $R_2$ are each selected from hydrogen, alkyl of 1 to 3 carbon atoms and alkenyl of 2 to 4 atoms or $R_1$ and $R_2$ together form a methylene or ethylene group and
$R_3$ and $R_4$ are each selected from hydrogen and methyl.

This invention also relates to fungicidal compositions comprising a compound of Formula I and an inert pesticidal diluent.

Preferred compounds of Formula I for use in the methods and compositions of this invention are those wherein $R_1$ and $R_2$ are each selected from the group consisting of hydrogen and methyl or together form a methylene bridge and wherein $R_3$ and $R_4$ are both hydrogen. The most preferred compound is 1,4-dihydro-1,4-methano-9,10-anthraquinone.

DETAILED DESCRIPTION OF THE INVENTION

This invention is based on the discovery that the compounds of Formula I are markedly effective in the control of a variety of fungicidal diseases of plants and plant parts. For example, these compounds are useful in the control of fungus diseases of foliage, fruit, stems and roots of growing plants. Fruits, tubers, bulbs, roots, seeds and other plant parts harvested for food, animal feeds or other purposes can be protected from fungus deterioration during processing, distribution and storage. Seeds, tubers, cuttings and other plant propagation parts can also be protected from fungus and bacterial attack during handling and storage and in the soil after planting.

As mentioned above, the compounds of Formula I possess particularly outstanding activity against fungi of the class Phycomycetes. These and other fungi controlled by the methods of this invention are responsible for many serious diseases of food, feed, foliage and fiber crops. Compounds of Formula I are particularly effective in the control of the species Phytophthora infestans which is responsible for tomato and potato late blight.

Other plant pathogenic fungi controlled by the methods of this invention include but are not limited to the following:

Phytophthora cinnamomi—Heart rot of pineapples
Phytophthora parasitica—Foot rot and brown fruit of citrus
Phytophthora citrophthora—Foot rot and brown fruit of citrus
Plasmopara viticola—Downy mildew of grapes
Pseudoperonospora cubensis—Downy mildew of cucurbits
Phytophthora phaseoli—Downy mildew of lima beans
Peronospara effusa—Downy mildew of spinach
Venturia inaequalis—Apple scab
Uromyces phaseoli—Bean rust
Puccinia recondita—Leaf rust of wheat
Puccinia coronata—Leaf rust of oats
Puccinia glumarum—Leaf rust of grasses
Puccinia graminis tritici—Stem rust of wheat Compounds of Formula I are also effective in controlling soil-borne fungi of the genera Rhizoctonia and Pythium which attack roots and other underground parts of a variety of plants.

Preparation

The 1,4-dihydro-9,10-anthraquinones of Formula I can be prepared by reacting an appropriately substituted diene with 2-chloro-1,4-naphthoquinone or other 1,4-naphthoquinone having a 2-substituent which can be removed thermally in a subsequent step. Illustrative of such 2-substituents are bromo, methoxyl, acetoxyl and p-toluenesulfonyl. The condensation of the diene and the 1,4-naphthoquinone can be carried out at ambient temperatures, but higher temperatures are required for elimination of the 2-substituent. It is most convenient to carry out the entire reaction in a boiling hydrocarbon solvent such as benzene, toluene or xylene. This method of preparation, which is more fully described in German Pat. No. 500,160, can be represented by the following equation:

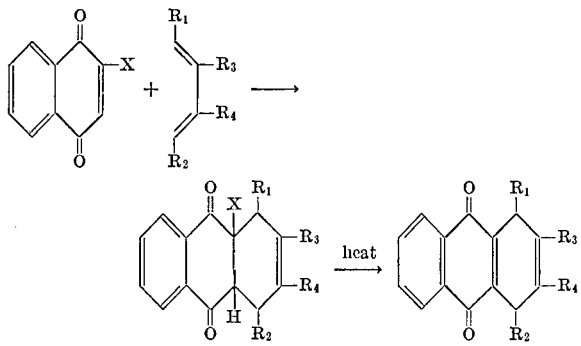

where X is for example chloro, bromo, methoxyl, acetoxyl or p-toluenesulfonyl.

Some of the compounds of Formula I can also be prepared by reacting an appropriately substituted diene and naphthoquinone, followed by isomerization of the tetrahydro-anthraquinone obtained with either acid or base to yield the corresponding dihydroanthrahydroquinone which is then oxidized to the desired dihydroanthraquinone. This procedure, which is more fully described in Chem. Ber., 62B, 2337–72 (1929) can be represented by the following equation:

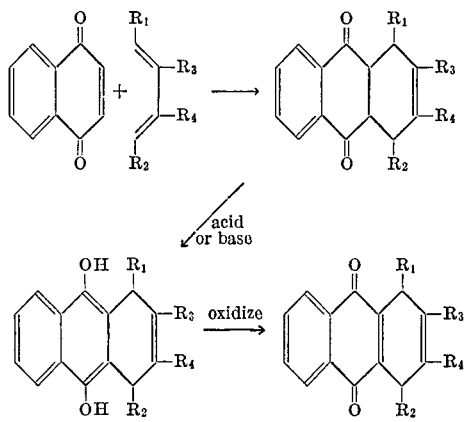

Compositions

The fungicidal compositions of this invention are comprised of from 5 to 95% by weight, preferably 10 to 90% by weight of a compound of Formula I and from 95 to 5% by weight, preferably 90 to 10% by weight, of an inert pesticidal diluent. These compositions will usually also contain one or more surface-active agents and other ingredients as desired to produce solutions, dusts, wettable powders, aqueous suspensions, granules, pellets, emulsifiable concentrates and the like.

The surface active agents, or surfactants as they are sometimes called, serve as wetting, dispersing and emulsifying agents, and can include many anionic, nonionic and cationic agents such as have heretofore been used in agricultural compositions. Suitable surfactants are set out for example in U.S. Pats. 2,426,417; 2,655,447; 2,412,510 and 2,139,276 and in "Detergents and Emulsifiers 1967 Annual" (John W. McCutcheon, Inc.). Surfactants will usually be present in compositions of this invention in the range of from 0.1 to 20% by weight, with 0.2 to 10% by weight of the surfactant being preferred.

Anionic and nonionic surfactants are preferred. Preferred surfactants are alkali metal and amine salts of alkyl benzene sulfonic acids such as dodecyl-benzene sulfonic acid, sodium lauryl sulfate, alkyl naphthalene sulfonates, sodium-N-methyl-N-oleyltaurate, oleic acid ester of sodium isethionate, diacetyl sodium sulfosuccinate and sodium dodecyldiphenyl oxide disulfonate, alkyl phenoxy poly(ethyleneoxy)ethanols such as nonyl phenol adducts with ethylene oxide, trimethyl nonyl polyethylene glycol esters, polyethylene oxide adducts of fatty and rosin acids, long chain alkyl and mercaptan adducts with ethylene oxide, methyl cellulose, polyvinyl alcohol, sodium and calcium lignin sulfonates, polymeric alkyl-naphthalene sulfonates and polymethylene bis sulfonates.

Dust compositions of this invention will generally contain from 1 to 30% by weight of a compound of Formula I, preferably 3 to 15%, extended with a free-flowing inert powder. Free-flowing inert powders can be any of the agricultural extenders commonly employed in the pesticide art. They include inert finely divided diluents such as attapulgite, kaolinite, diatomaceous earths, pyrophyllite, talc, synthetic mineral fillers derived from silica and silicates such as synthetic fine silica and synthetic calcium and manganese silicate, carbonates, phosphates and sulfates, sulfur, lime and flours such as wood, walnut shell, redwood, soybeans and cottonseed. Particle size of the extender can vary considerably but will ordinarily be somewhat under 50 microns. Ureas and other fertilizers can be added to dust formulations bringing the concentration of active ingredient present down to 0.5 to 5% by weight of the total formulation.

Wettable powder compositions of this invention usually contain the active ingredient, one or more surfactants and one or more inert diluents of the type used to prepare dusts. The active ingredient will ordinarily be present at a concentration in the range of from 25 to 85% by weight. Surfactants will be present in a range from 0.1 to 10% by weight so as to obtain adequate wetting and dispersion in water.

Granules can be prepared by spraying a concentrated wettable powder slurry or a solution of the active ingredient in a liquid carrier over the surface of a support such as preformed clay granuales or expanded vermiculite. It is also possible to mix finely divided clays with the finely divided active ingredient, moisten the mixture and then granulate. In these compositions, the active compound ordinarily will be present at the rate of 1 to 25% by weight, with 3 to 15% by weight being preferred.

Aqueous suspension formulations are prepared by combining the active ingredient with dispersing agents, suspending agents, wetting agents and water. This mixture is ground in a ball mill, sand mill or other device for fine grinding of pastes until all of the particles are substantially less than 15 microns in diameter. In these compositions the active compound ordinarily will be present at the rate of 10 to 50% by weight, with 25 to 40% by weight being preferred.

Compositions of this invention can additionally contain known insecticides, fungicides, acaricides, nematocides, fertilizers and nutrients such as the following:

1,2,3,4,10,10 - hexachloro - 1,4,4a,5,8,8a-hexahydro-1,4-endoexo-5,8-dimethanonaphthalene (aldrin);

1,2,3,4,5,6-hexachlorocyclohexane (lindane);

2,3,4,5,6,7,8,8a - octachloro - 4,7 - methano - 3a,4,7,7a-tetrahydroindane;

α,α-Bis(p-chlorophenyl)-β,β,β-trichloroethane;

1,2,3,4,10,10 - hexachloro - 6,7 - epoxy - 1,4,4a,5,6,7,8,8a-octahydro - 1,4 - endoexo - 5,8 - dimethanonaphthalene (dieldrin);

1,2,3,4,10,10 - hexachloro - 6,7 - epoxy - 1,4,4a,5,6,7,8,8a-octahydro - 1,4 - endoendo - 5,6 - dimethylnaphthalene (endrin);

1 (or 3a),4,5,6,7,8,8a-heptachloro-3a,4,7,7a-tetrahydro-4,7-methanoindene;

1,1,1-trichloro-2,2-bis(p-methoxyphenyl)ethane (methoxychlor);

1,1-dichloro-2,2-bis(p-chlorophenyl)ethane;

Chlorinated camphene having a chlorine content of 67–69%;

2-nitro-1,1-bis(p-chlorophenyl)butane;

1-naphthyl-N-methylcarbamate (Sevin);

Methylcarbamic acid, ester with phenol, 4-(dimethylamino)-3,5-dimethyl;
Methylcarbamic acid, ester with 1,3-dithiolan-2-one oxime;
O,O-diethyl-O-[2-isopropyl-4-methylpyrimid - 6 - yl] thiophosphate;
O,O - dimethyl-1-hydroxy-2,2,2-trichloromethyl phosphonate;
O,O - dimethyl-S-(1,2-dicarbethoxyethyl) dithiophosphate (malathion);
O,O-dimethyl - O - p - nitrophenyl thiophosphate (methyl parathion);
O,O-diethyl-O-p-nitrophenyl thiophosphate (parathion);
O,O-dimethyl-O-(3-chloro-4-nitrophenyl)-thiophosphate;
Di - 2 - cyclopentenyl - 4 - hydroxy - 3 - methyl - 2 - cyclopenten-1-one chrysanthemate;
O,O-dimethyl-O-(2,2-dichlorovinyl) phosphate (DDVP);
Mixture containing 53.3% 2-nitro-1,1-bis(p-chlorophenyl)-butane, 26.7% 2-nitro-1,1-bis(p-chlorophenyl) propane and 20.0% related compounds;
O,O-dimethyl-O-(2,4,5-trichlorophenyl) phosphorothioate;
O,O-dimethyl - S - (4 - oxo - 1,2,3 - benzotriazine - 3(4H)-yl-methyl)phosphorodithioate (Guthion);
Bis-(dimethylamino) phosphorous anhydride;
O,O-diethyl-O-(2 - keto - 4-methyl-7-$\alpha'$-pyranyl) thiophosphate;
Calcium arsenate;
Sodium aluminofluoride;
Dibasic lead arsenate;
2'-chloroethyl-1-methyl-2-(p-tert - butylphenoxy) ethyl sulfite;
Azobenzene;
Ethyl 2-hydroxy-2,2-bis(4-chlorophenyl)acetate;
O,O-diethyl-O-(2-ethylmercapto)ethyl thiophosphate;
2,4-dinitro-6-sec-butyl phenol;
Toxaphene;
O-ethyl O-p-nitrophenylbenzenethiophosphonate;
4-chlorophenyl-4-chlorobenzene sulfonate;
p-Chlorophenyl-phenyl sulfone;
Tetraethyl pyrophosphate;
1,1-bis-(p-chlorophenyl)ethanol;
1,1-bis-(chlorophenyl)-2,2,2-trichloroethanol;
p-Chlorophenyl-p-chlorobenzyl sulfide;
Bis-(p-chlorophenoxy) methane;
3-(1-methyl-2-pyrrolidyl) pyridine;
Mixed esters of pyrethrolone and cinerolone keto-alcohols and two chrysanthemum acids;
Cube and derris, both whole root and powdered;
Ryanodine;
Mixture of alkaloids known as veratrine;
dl-2-allyl - 4 - hydroxy - 3 - methyl-2-cyclopenten-1-one esterified with a mixture of cis and trans di-chrysanthemum monocarboxylic acids;
Butoxypolypropylene glycol;
p-Dichlorobenzene;
2-butoxy-2'-thiocyanodiethyl ether;
Naphthalene;
1,1-dichloro-2,2-bis(p-ethylphenyl)ethane;
p-Dimethylaminobenzenediazo sodium sulfonate;
Quinone oxyaminobenzooxohydrazone;
Tetraalkyl thiuram sulfides such as tetramethyl thiuram monosulfide or disulfide and tetraethyl thiuram monosulfide or disulfide;
Metal salts of ethylene bisdithiocarbamic acid, e.g., manganese, zinc, iron and sodium salts;
Pentachloronitrobenzene;
N-dodecylguanidine acetate (dodine);
N-trichloromethylthiotetrahydrophthalimide (captan);
Phenylmercury acetate;
2,4-dichloro-6-(o-chloroaniline)-s-triazine (Dyrene);
N-methylmercury-p-toluenesulfonanilide;
Chlorophenolmercury hydroxides;
Nitrophenolmercury hydroxides;
Ethylmercury acetate;
Ethylmercury 2,3-dihydroxypropyl mercaptide;
Methylmercury acetate;
Methylmercury 2,3-dihydroxypropyl mercaptide;
3,3'-ethylenebis(tetrahydro-4,6-dimethyl-2H-1,3,5-thiadiazine-2-thione);
Methylmercury dicyandiamide;
N-ethylmercury-p-toluenesulfonilide;
1-4,dichloro-2,5-dimethoxy benzene;
Metal (e.g., iron, sodium and zinc) ammonium and amine salts of dialkyl dithiocarbamic acids;
Tetrachloronitroanisole;
Hexachlorobenzene;
Hexachlorophene;
Methylmercury nitrile;
Tetrachloroquinone;
N-trichloromethylthiophthalimide;
1,2-dibromo-3-chloropene;
1,2-dibromo-3-chloropropene;
Dichloropropane-dichloropropene mixture;
Ethylene dibromide;
Chloropicrin;
Sodium dimethyl dithiocarbamate;
Tetrachloroisophthalonitrile;
1-benzimidazole carboxylic acid, 2-carboxyamino-dimethyl ester;
Streptomycin;
2-(2,4,5-trichlorophenoxy) propionic acid;
1,4-dichloro-2,5-dimethoxy benzene;
p-Chlorophenoxyacetic acid;
2-(carboxyamino)-1-benzimidazole carboxylic acid, dimethyl ester;
1-naphthalene acetamide;
N-1-naphthylacetamide;

When included in the compositions of this invention, these compounds are usually present in an amount by weight ranging from one-tenth to ten times that of the compound of Formula I. The use of pesticides such as those listed above in combination with a compound of Formula I sometimes appears to greatly enhance the activity of one or both of the active ingredients.

APPLICATION

In practicing the methods of this invention, one or more compounds of Formula I are applied to an area to be treated in amount sufficient to exert the desired pesticidal action. The "area to be treated" can include living plant tissue, plant reproductive parts and any other locus where plant pathogenic fungi are present or where fungus infestation is anticipated. The amount of a compound of Formula I sufficient to exert the desired action upon plant pathogenic fungi is referred to herein as the "fungicidal amount" or as the "effective amount." The expression "controlling fungi" as used herein includes killing, inactivating or otherwise preventing the destructive effects of these organisms.

It will be appreciated that the effective amount of a compound of Formula I will vary for example with the particular organisms to be controlled, the particular active ingredient and type of formulation utilized, the plant species to be protected and local conditions such as temperature and humidity. Since many factors are involved it is not possible to indicate generally one rate of application suitable for all situations. However, effective resolution of these factors in determining the effective amount in a given situation is well within the ability of persons of ordinary skill in the art. Generally suitable ranges of application rates for particular methods and purposes are set forth below.

The compounds of Formula I provide especially effective fungicidal protection for living plants such as fruit-bearing, nut-bearing, ornamental and forest trees; vegetable, horticultural, fiber, grain, forage, hay and seed crops; sugar cane; sugar beets; pineapples; beans; peas; potatoes, peanuts; sweet potatoes; tobacco; hops; turfs and pastures. Such living plants can be protected from plant-pathogenic fungi by applying one or more of the compounds of Formula I to the soil in which they are growing or in which they are to be seeded or planted; to seeds, tubers, bulbs and other plant reproductive parts prior to planting; and to foliage, stems and/or fruit of the living plant. Living plants can also be protected from soil-borne fungi by dipping the root system into a suitable formulation of a compound of Formula I prior to planting.

Preferred rates of application to soil in which plants are or will be growing are from 1 to 500 parts by weight per million by weight of soil in which fungicidal protection is desired. More preferred use rates for this method of application are in the range of from 2 to 200 parts per million with from 5 to 50 parts per million being the most preferred. These concentrations of active ingredient in the soil will ordinarily be obtained by applications of from 2 to 100 kilograms per hectare of soil treated. In-the-furrow applications are preferably made at rates of from 200 to 2000 grams per 4000 linear meters of row.

Preferred rates of application to seeds, tubers, bulbs and other plant reproductive parts are from 0.25 to 8.0 kilograms of active ingredient per 100 kilograms of plant parts treated. More preferred rates for this method of application are from 0.5 to 5.0 kilograms per 100 kilograms of plant parts, with 0.1 to 2.0 kilograms per 100 kilograms of plant parts being most preferred. Dusts, suspensions and solutions are preferred formulations for treatment of plant reproductive parts.

For application of compounds of Formula I to foliage, stems and/or fruit of living plants, rates of from 0.12 to 70 kilograms of active ingredient per hectare are preferred with 0.25 to 35 kilograms per hectare being more preferred. The most preferred rates for application to living plants are from 0.5 to 15 kilograms per hectare. For continued protection of living plants, repeated application may be necessary at intervals of from 1 to 60 days.

Preferred rates for dip applications to roots of living plants are from 0.001 to 4 kilograms of active ingredient per 100 liters of water or other liquid carrier. More preferred rates for dip applications are from 0.002 to 2.0 kilograms per 100 liters of carrier, 0.004 to 1.0 kilogram per 100 liters being most preferred.

Application to foliage, stems and fruit of living plants at the rates indicated above is generally accomplished by employing sprays, dusts or aerosols. For best results, application should be initiated prior to the appearance of symptoms of fungus infestation and should be continued on a predetermined schedule. Protection of living plants from damage caused by fungi through the use of compounds of Formula I is sometimes improved by including a surface active agent in the spray, dusts or aerosol utilized. The most preferred surface active agents for the use in such formulations include vinyl or other polymeric resins, glycol esters, ethoxylated fatty acids, alcohol sulfates, lecithin and lecithin derivatives, isothionates, isethionates, certain phosphate derivatives and taurates. Somewhat less preferred, but nevertheless effective, surface active agents include sulfo, succinate derivatives, ethoxylated fatty esters and oils, ethoxylated alcohols, and dodecyl and tridecyl benzene sulfonates and free acids. Examples of specific surface active agents in each of these several categories are listed in "Detergents and Emulsifiers—1965 Annual" (John W. McCutcheon, Inc.) on pages 11 to 17, inclusive. When used in sprays and aerosols for application to living plants, the surfactants will ordinarily be present at rates of from 10 to 100,000 parts per million of the carrier. More preferred rates are from 30 to 30,000 parts per million, with 100 to 10,000 parts per million being most preferred. For dusts, the preferred surfactant rates are from 1000 to 300,000 parts per million. More preferred rates are in the range from 5000 to 200,000 parts per million, with 10,000 to 100,000 parts per million being most preferred.

Plant parts such as fruits, tubers, bulbs, roots and the like, harvested for food or animal feed, are protected from decay and other deterioration caused by fungi during processing, distribution and storage by dipping the plant parts in a liquid bath, dusting with a finely divided formulation, spraying or applying a mist by means of an aerosol. Liquid baths for this purpose will contain from about 1 to about 5000 parts by weight of the active ingredient per million parts by weight of the fluid carrier. A more preferred range for the bath is from 5 to 2500 parts per million of the active ingredient and the most preferred range is from 10 to 1000 parts per million of the active ingredient. Dusts used for this type of application contain from 0.1 to 10 percent of the active ingredient, preferably from 0.1 to 5 percent by weight and most preferably from 0.2 to 2.5 percent by weight of the active ingredient.

In order that the methods and compositions of this invention can be more easily understood, the following additional examples are provided. All parts and percentages are by weight unless otherwise indicated.

EXAMPLE 1

| Wettable powder: | Percent |
|---|---|
| 1,4-dihydro-1,4-methano-9,10-anthraquinone | 50.0 |
| Sodium alkyl aryl sulfonate | 2.0 |
| Sodium lignin sulfonate | 4.0 |
| Kaolin clay | 44.0 |

The above ingredients are blended, ground through an air attrition mill until all particles are substantially less than 15 microns in diameter and then reblended to homogeneity.

The wettable powder so prepared is extended with water at a rate of 100 liters of water per 400 grams of powder. Eight hundred liters of the resulting suspension are sprayed on a one-hectare plot within a potato field when the plants are about 10 centimeters tall. This application is repeated at weekly intervals until just prior to harvest. At harvest time the potato plants within the treated plot are healthy and yield a good crop of sound potato tubers whereas plants in the unsprayed area immediately surrounding the test plot are heavily damaged by the late blight fungus (*Phytophthora infestans*) and yield very few marketable tubers.

EXAMPLE 2

| Wettable powder: | Percent |
|---|---|
| 1,4-dihydro-9,10-anthraquinone | 75.0 |
| Sodium alkyl naphthalene sulfonate | 3.0 |
| Sodium lignin sulfonate | 4.0 |
| Synthetic fine silica | 3.0 |
| Montmorillonoid clay | 15.0 |

The above ingredients are blended, ground and reblended as described in Example 1.

The resulting wettable powder is extended with water to give a suspension containing 300 grams of the powder per 100 liters. This suspension is applied at a rate of 1500 liters per hectare to alternate rows of grapes in a uniform field planting. This application is made soon after new foliage appears and is repeated at weekly intervals until the end of the growing season. Grape vines in the treated rows remain healthy and exhibit good growth throughout the season whereas the untreated rows become heavily damaged by downy mildew which is caused by the Phycomycete fungus *Plasmopara viticola*. Also, new vine growth in the untreated rows is much less than that in the treated rows.

EXAMPLE 3

| Aqueous suspension: | Percent |
|---|---|
| 1,4-dihydro-1,4-ethano-9,10-anthraquinone | 30.0 |
| Calcium lignin sulfonate | 15.0 |
| Hydrated attapulgite clay | 1.75 |
| Sodium dioctyl sulfosuccinate | 1.0 |
| Water | 52.25 |

The sodium dioctyl sulfosuccinate is dissolved in sufficient water to prepare a concentrated solution. The remaining ingredients are combined and ball milled until substantially all particles of the active ingredient are less than 5 microns of diameter. The solution and the ball milled suspension are then combined and stirred until a homogeneous suspension is obtained. This suspension is characterized by its extremely small particle size and when diluted with water and sprayed on plant foliage provides very uniform coverage.

This suspension is diluted with water at a rate of 0.6 liter per 100 liters of water. "Trem 014" (polyhydric alcohol esters available from Nopco Chemical Co., Newark, N.J.) is then added to the diluted suspension at a rate which provides 300 parts per million of this surfactant. The resulting formulation is then used to spray alternate apple trees in a uniform planting shortly after the appearance of leaves in the spring. Each tree is sprayed with about 40 liters of this suspension. This treatment is repeated at intervals of from 7 to 14 days until one month prior to harvest. At this time the sprayed trees are healthy and eventually yield a good harvest of high quality fruit. Those trees which do not receive the spray treatment show the result of a serious attack by the apple scab fungus (*Venturia inaequalis*). Both the foliage and the fruit of the untreated trees are seriously damaged.

EXAMPLE 4

| Dust formulation: | Percent |
|---|---|
| 1,4-dihydro-1,4-dimethyl-9,10-anthraquinone | 10.0 |
| Diatomaceous silica | 10.0 |
| Calcium carbonate surface coated with a calcium stearate | 80.0 |

The active ingredient and the diatomaceous silica are blended and ground in an air attrition mill until substantially all particles are less than 15 microns in diameter. The resulting mixture is then blended with the coated calcium carbonate. The resulting dust is applied weekly at a rate of 12 kilograms per hectare to plots within a tomato field. The first application is made when the plants are from 20 to 30 centimeters tall. After three months, the plants in the treated plots are healthy and are yielding a high level of good quality fruit whereas plants in the untreated portions of the same field are seriously damaged by the late blight fungus (*Phytophthora infestans*) and provide a poor yield.

EXAMPLE 5

| Wettable powder: | Percent |
|---|---|
| 1,4-dihydro-1-methyl-9,10-anthraquinone | 50.0 |
| 2 - (1-methyl-N-heptyl)-4,6-dinitrophenyl crotonate | 12.5 |
| Sodium alkyl naphthalene sulfonate | 1.5 |
| Low molecular weight methyl cellulose | 0.5 |
| Kaolin clay | 35.5 |

These ingredients are blended, ground and reblended as described in Example 1.

The resulting wettable powder is added to water containing 400 parts per million of Triton B–1956 (a modified phthalic glycerol alkyd resin surfactant produced by the Rohm and Haas Co.) at a rate of 400 grams of the powder per 100 liters of water. The resulting suspension is sprayed on plots selected at random in an otherwise untreated field of cucumbers in which the plants are just starting to form runners. This treatment is repeated weekly for a period of three months. Each application is made at a rate of 700 liters of the diluted suspension per hectare.

At the end of the three month period, cucumber plants outside the treated plots show heavy damage from the downy mildew fungus (*Pseudoperonospara cubensis*) and from mites whereas plants within the treated plots are healthy and show no damage from fungi or mites. The 2-(1-methyl-N-heptyl)-4,6-dinitrophenyl crotonate is a known acaracide.

EXAMPLE 6

| Wettable powder: | Percent |
|---|---|
| 1,4-dihydro-1-vinyl-9,10-anthraquinone | 50.0 |
| 2-(methoxycarbonylamino) - 1 - benzimidazole carboxylic acid, methyl ester | 12.5 |
| Sodium lauryl sulfate | 0.5 |
| Low molecular weight polyvinylalcohol | 0.5 |
| Kaolin clay having a pH of less than 5.0 | 36.5 |

A wettable powder prepared from the above ingredients as described in Example 1 is added to water at a rate of 300 grams per 100 liters of water. The resulting suspension is sprayed at a rate of 800 liters per hectare onto a field of cucumber plants which are just starting to form runners. This treatment is repeated each week for a period of ten weeks. At the end of this period the treated plants are healthy, free of mites and growing rapidly whereas cucumber plants in adjoining, untreated fields show extensive damage due to the downy mildew fungus (*Pseudoperonospara cubensis*), the powdery mildew fungus (*Erysiphe cichoracearum*) and mites. The 1,4-dihydro-1-vinyl-9,10-anthraqunione is responsible for the control of the downy mildew fungus in the treated fields and the 2-(methoxycarbonylamino) - 1 - benzimidazole carboxylic acid, methyl ester is responsible for the control of the powdery mildew fungus and the mites.

EXAMPLE 7

| Wettable powder: | Percent |
|---|---|
| 1,4-dihydro-2,3-dimethyl-9,10-anthraquinone | 30.0 |
| N-trichloromethylthio - 4 - cyclohexene-1,2-dicarboximide | 30.0 |
| Sodium dioctyl sulfosuccinate | 1.0 |
| Partially desulfonated sodium lignin sulfonate | 2.0 |
| Diatomaceous silica | 37.0 |

The above ingredients are blended together, ground in an air attrition mill until all particles are substantially less than 15 microns in diameter and then reblended to homogeneity.

A slurry of this powder is prepared by adding it to water at a rate of 300 grams per liter. This slurry is sprayed on cut Irish potato seed pieces at a rate of 1.5 liters per 100 kilograms of seed pieces. After the seed pieces have dried they are planted in a normal manner. A full stand of thrifty plants quickly emerge in the area planted with the treated seed pieces. Only a partial stand of unhealthy plants is obtained in areas planted with untreated seed pieces from the same lot of potatoes due to seed piece root and attack on the roots of the young plants by soil fungi such as Pythium and Rhizoctonia. The 1,4-dihydro-2,3-dimethyl - 9,10 - anthraquinone and N-trichloromethylthio-4-cyclohexene - 1,2-dicarboximide both contribute to the control of the fungi.

EXAMPLE 8

| Wettable powder: | Percent |
|---|---|
| 1,4-dihydro-2-methyl-9,10-anthraquinone | 35.0 |
| Manganese ethylenebisdithiocarbamate | 35.0 |
| Sodium alkyl naphthalene sulfonate | 1.0 |
| Calcium lignin sulfonate | 3.0 |
| Synthetic fine silica | 10.0 |
| Kaolin clay | 16.0 |

A wettable powder produced from the above ingredients as described in Example 1 is added to water at a rate of 300 grams per 100 liters. The resulting suspension is sprayed on alternate rows in a lima bean field at weekly intervals beginning when and continuing throughout the growing season. The spray volume employed for each application is 700 liters per hectare actually treated. Throughout the growing season, all of the plants in the treated rows are healthy and produce good yields of high quality beans. Plants in the untreated rows, however, are seriously damaged by the lima bean downy mildew fungus (*Phytophthora phaseoli*).

EXAMPLE 9

Wettable powder: Percent
- 1,4-dihydro-1-propyl-9,10-anthraquinone ..... 35.0
- Zinc ethylenebisdithiocarbamate ............ 35.0
- Polyoxyethylene ester of mixed fatty and resin acids concreted with urea ................ 5.0
- Montmorillonoid clay ....................... 25.0

A wettable powder prepared from the above ingredients as described in Example 1 is added to water at a rate of 250 grams per 100 liters. The resulting suspension is sprayed on randomly selected plots within an otherwise untreated spinach field. This application is made at a rate of 700 liters of suspension per hectare when the first spinach leaves are 2 centimeters long and is repeated each week for a period of 8 weeks. At the end of this period, the plants in the treated plots are healthy and are growing well whereas plants in the untreated portion of the field show serious damage from the downy mildew fungus (*Peronospora effusa*).

EXAMPLE 10

Wettable powder: Percent
- 1,4-dihydro-1-(1-methylallyl)-9,10-anthraquinone ................................... 40.0
- Tetramethyl thiuram disulfide .............. 40.0
- Sodium alkyl naphthalene sulfonate ......... 1.5
- Partially desulfonated sodium lignin sulfonate . 2.5
- Synthetic fine silica ...................... 16.0

A wettable powder prepared from the above ingredients as described in Example 1 is added to water at a rate of 5 kilograms per 100 liters. The resulting suspension is sprayed onto the surface of selected plots within a field at a rate of 500 liters per hectare and is worked into the soil to a depth of 4 inches with a rotovator. Pineapples are then planted in the entire field. Pineapples eventually harvested from the treated plots are healthy and are of excellent quality. However, the pineapples from the untreated portions of the field are unmerchantable or are of reduced quality due to heart rot caused by *Phytophthora cinnamomi*.

EXAMPLE 11

Wettable powder: Percent
- 1,4-dihydro-9,10-anthraquinone ............. 35.0
- α-Bis(p-chlorophenyl)-β,β,β-trichloroethane .. 35.0
- Polymerized sodium salts of alkyl naphthalene sulfonic acid ............................ 1.5
- Sodium lauryl sulfate ...................... 1.0
- Synthetic fine silica ...................... 10.0
- Attapulgite clay ........................... 17.5

The above ingredients are blended together and hammer milled to produce a homogeneous mixture which is then air milled to produce a finely divided powder having a particle diameter substantially less than 5 microns.

The wettable powder so prepared is added to water at a rate of 600 grams per 100 liters to produce a suspension which is sprayed on alternate rows in a green bean planting at a rate of 700 liters per hectare. The first application is made when the bean plants are about 10 centimeters tall and the treatment is repeated at weekly intervals for a period of 12 weeks. In the untreated rows, the plants are extensively damaged by bean rust caused by the fungus *Uromyces phaseoli* and are also heavily infected with the Mexican bean beetle. Plants in the treated rows however are healthy and free from fungust and insect attack. The 1,4-dihydro-9,10-anthraquinone is responsible for the control of the bean rust and the α-bis(p-chlorophenyl)-β,β,β-trichloroethane is responsible for the control of the beetles.

EXAMPLE 12

Wettable powder: Percent
- 1,4-dihydro-1,4-methano-9,10-anthraquinone .. 30.0
- α-Bis(p-chlorophenyl)-β,β,β-trichloroethane .. 30.0
- Sodium alkyl naphthalene sulfonate ......... 1.5
- Calcium lignin sulfonate ................... 4.0
- Attapulgite clay ........................... 34.5

A wettable powder is produced from the above ingredients as described in Example 11 and is added to water at a rate of 700 grams per 100 liters. The resulting suspension is utilized as described in Example 11 and like results are obtained.

EXAMPLE 13

Wettable powder: Percent
- 1,4-dihydro-1,4-ethano-9,10-anthraquinone ... 35.0
- 1-naphthyl N-methylcarbamate ............... 35.0
- Sodium N-methyl-N-oleoyl taurate ........... 2.0
- Kaolin clay ................................ 28.0

The above ingredients are blended, ground and reblended as described in Example 1.

The wettable powder so prepared is added to water at a rate of 600 grams per 100 liters, the resulting suspension is sprayed on alternate rows within a uniform field of potato plantings when the plants are about 10 centimeters tall. This application is repeated at weekly intervals throughout the growing season. The spray volume is increased from 400 liters per hectare early in the season when the potato plants are small to 800 liters per hectare late in the season. At harvest time the potato plants in the untreated rows show serious damage from the late blight fungus (*Phytophthora infestans*) and the Colorado potato beetle. In contrast, the treated potato plants are healthy, are free from fungus and insect attack and produce high yields of sound potato tubers. 1-naphthyl N-methylcarbamate is a well known insecticide but is not effective against late blight fungus.

EXAMPLE 14

Wettable powder: Percent
- 1,4-dihydro-1,4-dimethyl-9,10-anthraquinone .. 30.0
- O,O-dimethyl-S-(1,2-dicarbethoxyethyl) dithiophosphate ............................... 30.0
- Sodium alkyl naphthalene sulfonate ......... 1.5
- Polymerized sodium salts of alkyl naphthalene sulfonic acids .......................... 2.5
- Diatomaceous earth ......................... 36.0

The above ingredients are formulated and applied in the manner described in Example 13 with the modification that the suspension contains 700 grams of powder per 100 liters of water. The results obtained are the same as described in Example 13.

EXAMPLE 15

Wettable powder: Percent
- 1,4-dihydro-1-methyl-9,10-anthraquinone ..... 25.0
- O,O-dimethyl-S-[4-oxo-1,2,3-benzotriazin-3-(4H)-yl methyl] phosphorodithioate ...... 25.0
- Oleoyl ester of sodium isethionate ......... 3.0
- Synthetic fine silica ...................... 10.0
- Diatomaceous earth ......................... 37.0

The above ingredients are formulated and applied as described in Example 13 with the modification that the suspension contains 800 grams of powder per 100 liters of water. The results obtained are the same as in Example 13.

EXAMPLE 16

Wettable powder: Percent
- 1,4-dihydro-1-vinyl-9,10-anthraquinone ..... 25.0
- O,O-diethyl-O-(p-nitrophenyl) phosphorothioate ................................... 25.0
- Sodium dioctyl sulfosuccinate .............. 1.0
- Partially desulfonated sodium lignin sulfonate . 2.0
- Diatomaceous earth ......................... 47.0

The above ingredients are formulated and applied as described in Example 13 with the modification that the suspension contains 800 grams of powder per 100 liters of water. The results obtained are the same as described in Example 13.

EXAMPLE 17

| Dust concentrate: | Percent |
|---|---|
| 1,4-dihydro-2,3-dimethyl-9,10-anthraquinone | 90.0 |
| Synthetic fine silica | 9.5 |
| Sodium alkyl naphthalene sulfonate | 0.5 |

The above ingredients are blended, ground and reblended as described in Example 1. The resulting dust concentrate is suitable for subsequent formulation into more dilute dusts or granular products.

This dust concentrate is diluted with talc to provide a free-flowing dust containing 5 percent by weight of 1,4-dihydro-2,3-dimethyl-9,10-anthraquinone. This dilute formulation is applied to large plots in a wheat field at a rate of 25 kilograms per hectare using an airplane equipped with dusting apparatus. Three such applications are made at equally spaced intervals during the period when the wheat heads are developing.

At harvest time, wheat in the untreated areas of the field are seriously damaged by the stem rust fungus, *Puccinia graminis tritici*. Wheat in the treated plots however is healthy, shows no damage from stem rust and yields well.

EXAMPLE 18

| Granules: | Percent |
|---|---|
| Wettable powder of Examples 2 | 13.4 |
| Attapulgite clay preformed granular 15–30 mesh | 86.6 |

The wettable powder of Example 2 is combined with the minimum amount of water necessary to prepare a usable spray mixture. This slurry is sprayed over the clay granules while they are being tumbled. The coated granules are then dried.

About 40 grams of these granules are worked into the soil around the base of orange trees about 20 centimeters in diameter at the base. The granules are worked in to a depth of about 5 to 7 centimers in a 20 centimeter band around the base of the tree. The trees are thereby protected from foot rot of citrus which is caused by the fungus *Phytophthora citrophthora*. Adjacent, untreated trees are seriously damaged by the foot rot of citrus.

What is claimed is:

1. A method of controlling plant-pathogenic fungi comprising applying to a locus to be protected a fungicidally effective amount of a compound of the formula wherein $R_1$ and $R_2$ are each hydrogen, alkyl of 1 to 3 carbon atoms and alkenyl of 2 to 4 atoms or $R_1$ and $R_2$ together form a methylene or ethylene group and $R_3$ and $R_4$ are each hydrogen or methyl.

2. The method of claim 1 wherein $R_1$ and $R_2$ are each hydrogen, methyl or together form a methylene bridge and wherein $R_3$ and $R_4$ are both hydrogen.

3. The method of claim 1 wherein said compound is 1,4-dihydro-1,4-methano-9,10-anthraquinone.

4. A fungicidal composition comprising an inert, wettable, fungicide diluent and a fungicidal amount of a compound of the formula 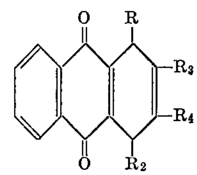 wherein $R_1$ and $R_2$ are each hydrogen, alkyl of 1 to 3 carbon atoms and alkenyl of 2 to 4 carbon atoms or $R_1$ and $R_2$ together form a methylene or ethylene group; and $R_3$ and $R_4$ are each hydrogen or methyl.

5. The composition of claim 4 wherein $R_1$ and $R_2$ are each hydrogen, methyl or together form a methylene bridge; and $R_3$ and $R_4$ are both hydrogen.

6. The composition of claim 4 wherein said compound is 1,4-dihydro-1,4-methano-9,10-anthraquinone.

References Cited

UNITED STATES PATENTS

| | | | |
|---|---|---|---|
| 2,584,139 | 2/1952 | Lidov et al. | 260—586 |
| 3,287,129 | 11/1966 | Rees et al. | 260—396 |

OTHER REFERENCES

Chemical Abstracts I, vol. 53, p. 3187c.
Chemical Abstracts II, vol. 49, p. 10910b.
Chemical Abstracts III, vol. 52, p. 7254e.
Chemical Abstracts IV, vol. 24, pp. 847 and 848.

SAM ROSEN, Primary Examiner

U.S. Cl. X.R.

260—396